United States Patent [19]

Delastre

[11] Patent Number: 5,519,944
[45] Date of Patent: May 28, 1996

[54] STRAIGHTNESS MEASURING DEVICE

[75] Inventor: Jean-Louis Delastre, Grenoble, France

[73] Assignee: EXA Ingenierie, Grenoble, France

[21] Appl. No.: 362,576

[22] PCT Filed: May 9, 1994

[86] PCT No.: PCT/FR94/00546

§ 371 Date: Mar. 8, 1995

§ 102(e) Date: Mar. 8, 1995

[87] PCT Pub. No.: WO94/27114

PCT Pub. Date: Nov. 24, 1994

[30] Foreign Application Priority Data

May 10, 1993 [FR] France ................................. 93 05887

[51] Int. Cl.[6] ....................................................... G01B 7/30
[52] U.S. Cl. ................................. 33/533; 33/1 Q; 33/412; 33/651.1
[58] Field of Search ........................... 33/1 Q, 286, 287, 33/338, 412, 485, 706, 708, 783, 784, 523.1, 533, 645, 651, 651.1, 552, 553; 361/760, 763, 766, 782

[56] References Cited

U.S. PATENT DOCUMENTS

| | | | |
|---|---|---|---|
| 2,308,018 | 1/1943 | Misz | 33/338 |
| 3,706,919 | 12/1972 | Abbe | 361/280 |
| 3,805,036 | 4/1974 | Michaud et al. | 33/533 |
| 4,324,048 | 4/1982 | Frost | 33/651 |
| 4,693,012 | 9/1987 | Cesna | 33/533 |
| 5,189,798 | 3/1993 | La Force | 33/1 Q |

FOREIGN PATENT DOCUMENTS

| | | | |
|---|---|---|---|
| 0004757 | 10/1979 | European Pat. Off. | |
| 0352247 | 1/1990 | European Pat. Off. | |
| 0556682 | 8/1993 | European Pat. Off. | |
| 2137545 | 2/1972 | Germany . | |
| 2532117 | 2/1976 | Germany . | |
| 62-231111 | 10/1987 | Japan | 33/1 Q |
| 198901 | 4/1989 | Japan | 33/533 |
| 42908 | 1/1992 | Japan | 33/533 |

OTHER PUBLICATIONS

"Integrated Tactile Imager with an Intrinsic Contour Detection Option", by R. F. Wolffenbuttel et al, Sensors and Actuators, vol. 16, No. 1/2, Jan. 1989, pp. 141–153.

Primary Examiner—William A. Cuchlinski, Jr.
Assistant Examiner—G. Bradely Bennett
Attorney, Agent, or Firm—Lowe, Price, LeBlanc & Becker

[57] ABSTRACT

A device for measuring the straightness of a conductive object includes a plurality of capacitive distance sensors which are aligned along an axis of a ruler to be placed on the object. Circuits are provided for indicating the measurements provided by each sensor.

7 Claims, 4 Drawing Sheets

5,519,944

STRAIGHTNESS MEASURING DEVICE

BACKGROUND OF THE INVENTION

1. Field of the Invention

The present invention relates to straightness measuring devices, and more particularly for measuring the straightness of a rail at its welding area.

2. Discussion of the Related Art

In laboratories, various methods for measuring and controlling the straightness of an object are used. These methods implement systems Which are too complex or too bulky to be used outside the laboratory, for example, for measuring on site the straightness of a rail, or any other object, fixed or too bulky to be transported into a measuring laboratory.

It is important to control the straightness of a rail, after welding and grinding, to ensure that important deformations do not cause vibrations due to the passage of trains.

FIG. 1 schematically represents a conventional device for measuring the straightness of a rail. It is a so called GEISMAR ruler. This device includes a frame (not shown) provided with two feet 10 which are placed on a rail 12. A belt 14 is tightened between two pulleys 16 and 17 parallel to the rail 12. One pulley, 16, is provided with a crank 16-1 to draw, parallel to the rail 12, a carriage 18 fixed to belt 14. Carriage 18 is guided by slippers (not shown) which must be very carefully fabricated because their straightness must be very accurate. Carriage 18 is provided with a sensor 18-1 biased toward the rail 12.

To measure the straightness of a rail 12, especially at a welding 12-1, an operator acts upon the crank 16-1 to move the carriage 18 from one pulley to the other. During this motion, a stylus (not shown) actuated by sensor 18-1 through a rod system, draws the profile of the rail onto a paper strip which is unrolled while carriage 18 is moving.

A first drawback of this device is its weight (at least two persons are needed to carry it) because, to ensure a sufficient accuracy, the device has a rigid structure, which makes necessary to use solid steel parts.

A second drawback of such a device is its fragility. Its accuracy may be easily ruined, for example, due to shocks or due to the fact that it was placed in an unstable position during its transport or its storage. Once the accuracy of such a device is ruined, it is practically impossible to correct it. A standard template of the device must be established; this template must be subtracted for each measured profile of a rail to obtain the real profile of the rail.

SUMMARY OF THE INVENTION

An object of the present invention is to provide a portable device for measuring the straightness of a conductive object, more particularly a rail, which is particularly light and easy to transport.

Another object of the present invention is to provide such a device which is particularly easy to calibrate even after a major deformation.

A further object of the present invention is to provide such a device which is particularly easy to use.

These objects are achieved according to the invention with a device for measuring the straightness of a conductive object, including a plurality of non-contacting distance sensors, which are aligned along an axis of a ruler to place on the object, and means for transmitting the measurements provided by each sensor.

According to an embodiment of the invention, the sensors are capacitive sensors. The ruler includes at each end a block to place on the object; at least one of these blocks is conductive and provides the object with an electric signal needed for operation of the capacitive sensors.

According to an embodiment of the invention, the capacitive sensors are formed on rectangular printed circuits including, on the surface opposite to the surface including the sensors, surface mounted electronic circuits designed to process the signals of the sensors.

According to an embodiment of the invention, the device includes means for displaying in a coordinate system the amplitudes of the measurements provided by the sensors as a function of the respective positions of the sensors.

According to an embodiment of the invention, the object is a rail.

According to an embodiment of the invention, each end of the ruler is fixed, in a removable way, to a block which includes gripping jaws to clamp the rail while aligning the axis of the sensors with the axis of the rail. In addition, once the blocks are fixed on the rail, means are provided for positioning the ruler laterally to measure the straightness of the rail edge at a predetermined position.

According to an embodiment of the invention, the capacitive sensors are formed by the central portion of aligned rings which are etched on a copper layer of the printed circuits, the copper outside the rings acting as guard rings.

According to an embodiment of the invention, the printed circuits are held between two opposite grooves inside a "U"-shaped portion of the ruler, one of the edges of each groove being straight and serving as an abutment for the printed circuits; the other edge of each groove being slanted to contact the printed circuit so that the printed circuit does not reach the bottom of the groove. Clamping means are provided to draw closer the two edges of the "U"-portion.

The foregoing and other objects, features, aspects and advantages of the invention will become apparent from the following detailed description of the present invention when taken in conjunction with the accompanying drawings.

DETAILED DESCRIPTION

Figure 2:
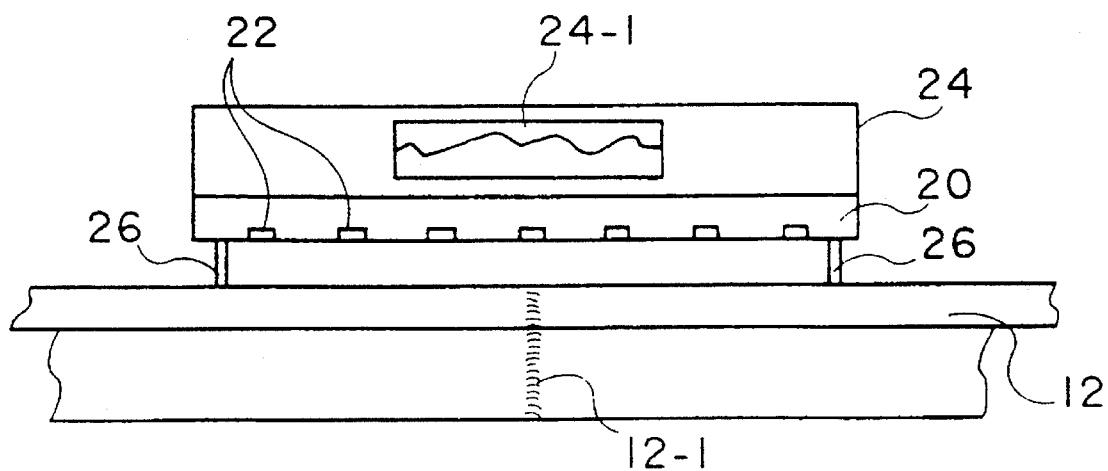
FIG. 2 represents an embodiment of a portable device for measuring the straightness of a conductive object according to the present invention.

FIG. 2 schematically represents a straightness measuring device, according to the invention, placed over a welding 12-1 of a rail 12. This device includes an elongated piece 20, hereinafter called ruler, provided at its lower surface with a plurality of non-contacting, for example inductive or capacitive, distance sensors 22, which are aligned along an axis along which the straightness is to be measured. Non-contacting sensors can be used since rail 12 is conductive.

The measuring device further includes a casing 24 provided with a screen 24-1 to display, by means of electronic circuits hereinafter described, the measurements provided by each sensor 22. Preferably, display is achieved in a system of coordinates where the measurement values are represented as a function of the positions of the corresponding sensors. The distance between sensors 22 is constant according to an embodiment of the invention. The distance could also be variable in other embodiments; more sensors by unit of length can be disposed in the middle of ruler 20 to measure with a better accuracy the rail profile in the welding area 12-1. The coordinate axis assigned to the positions of the sensors is then accordingly graduated on the screen display 24-1.

Each end of ruler 20 is provided with a block 26 to be placed over rail 12. These blocks are made of hard material, for example a metal carbide, to reduce wear due to numerous uses of the device.

Such a measurement device is particularly easy to achieve because sensors 22 need not be disposed very accurately, more particularly perpendicularly to rail 12. Indeed, as will be seen hereinafter, sensors 22 are managed by a microprocessor (which is the easiest way to process) which, upon request, executes a calibration program to store the correction values for each sensor 22. Thus, if there is a risk that the positions of sensors 22 are modified due to a shock, for example, the calibration sequence only is to be carried out again.

Figure 1:
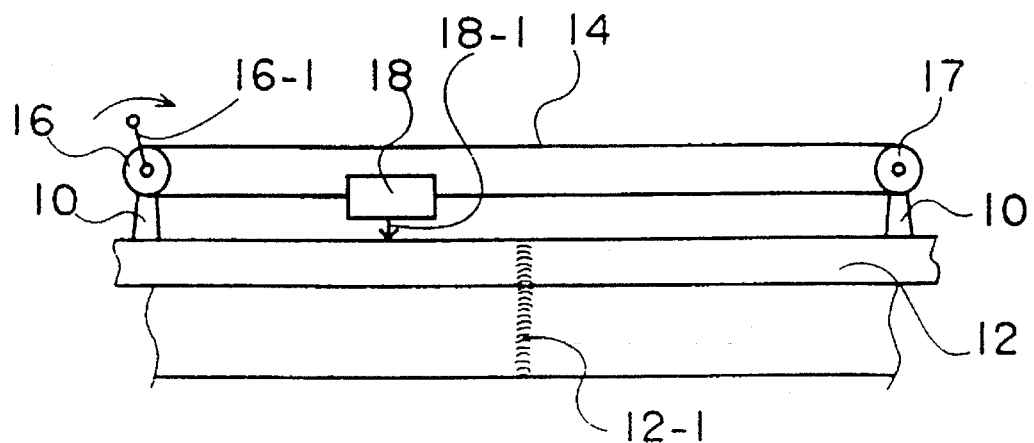
FIG. 1, above described, represents a conventional portable device for measuring the straightness of a rail.

In addition, since it is not necessary to provide accurate mechanical devices withstanding stresses and wear over time (carriage slippers in the device of FIG. 1), the measurement device according to the invention does not include any heavy parts. Of course, the position of sensors 22 must be steady over time, but these sensors are not subject to stresses and thus it is not necessary to fabricate ruler 20 to hold the sensors in a particularly rigid way. Accordingly, a measurement device according to the invention is very light and is portable by only one person (for measuring a length of approximately one meter, the device weights only 8 kilograms).

Of course, a device according to the invention is particularly easy to use since the microprocessor executes most of the measurement steps. The user merely has to press a key to display the rail profile.

Figure 3:
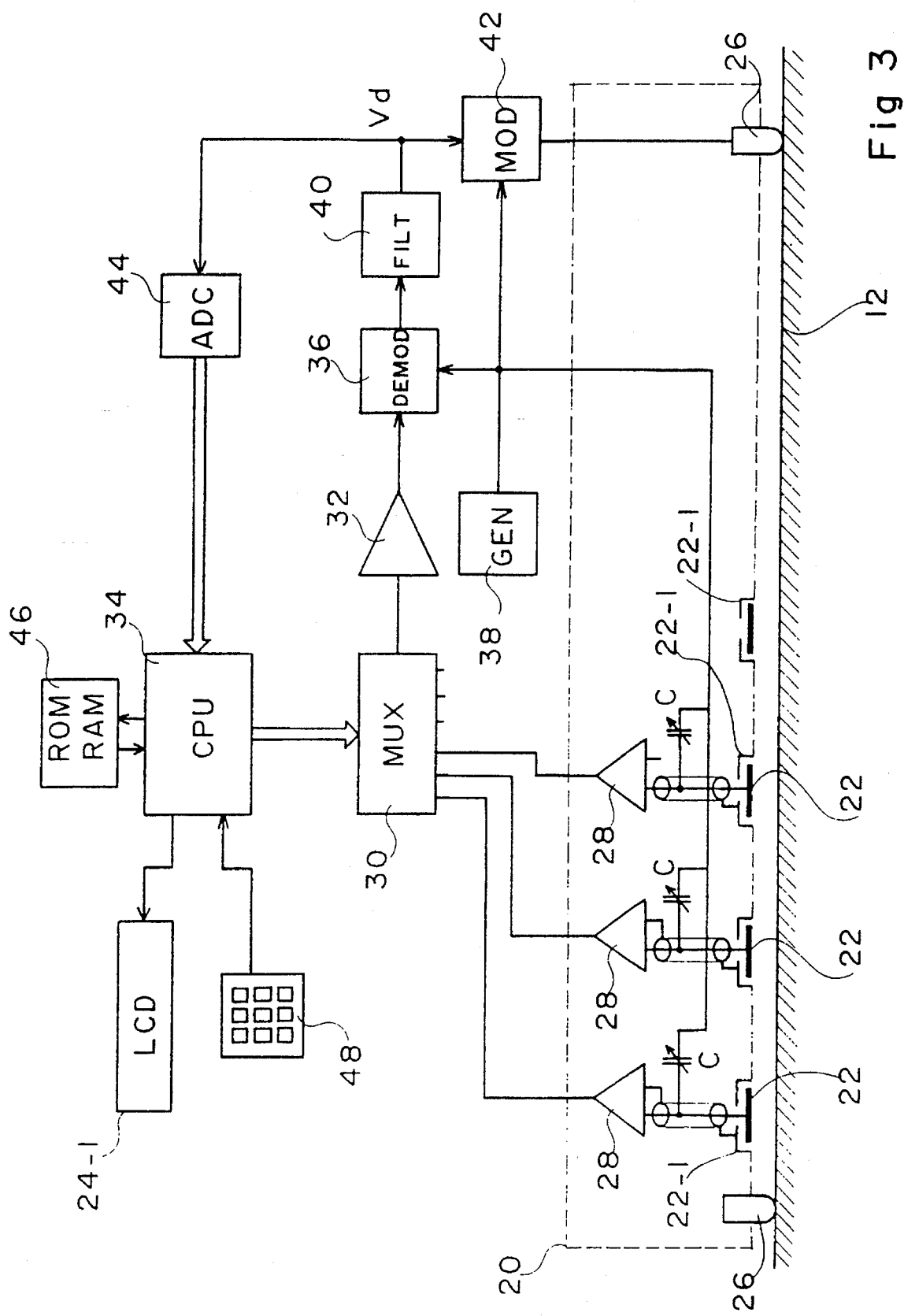
FIG. 3 schematically represents an architecture of a circuit for processing information that is provided by sensors for sensing distances used in the device according to the invention.

FIG. 3 schematically represents an embodiment according to the invention of the architecture of a circuit managing sensors 22 of the capacitive type. Preferably, the sensors are of the capacitive type and provide a signal having an amplitude proportional to the measured distance. The same elements as in FIG. 2 are designated with the same references. Each sensor 22 is formed by a metal plate surrounded with a guard ring 22-1 which is connected to a reference voltage. Plates 22 are disposed near rail 12 to be measured and are parallel with the latter. Each plate 22 is connected to a terminal of an adjustable capacitor C and to the input of a differential amplifier 28 whose other input is connected to the guard ring. Capacitors C are adjusted definitively in factory.

The outputs of amplifiers 28 are provided to an analog multiplexer 30 which transmits the output of one of the amplifiers 28 to the input of an amplifier 32. Multiplexer 30 is controlled by a microprocessor 34. The output of amplifier 32 is provided to a demodulator 36 whose other input receives a sine wave signal provided by a generator 38. The output of demodulator 36 is provided to a filter 40 which provides a substantially DC voltage Vd corresponding to the distance measured by the sensor 22 which is selected by multiplexer 30. Voltage Vd is applied to a modulator 42 whose other input receives the sine wave signal provided by generator 38. Generator 38 also supplies the adjustable capacitors C. Rail 12 receives the output of demodulator 42, which is connected to one of the blocks 26 on which is placed the measurement device.

The operation of a capacitive sensor is conventional and will not be described here. In contrast, an aspect of the present invention is to group amplifier 32, demodulator 36, generator 38, filter 40 and modulator 42 for the plurality of sensors 22. Since these grouped elements are the most expensive elements in a capacitive measurement device, this substantially decreases the costs.

Output Vd of filter 40 is provided to an analog/digital converter 44 connected to the central unit 34. In addition, microprocessor 34 is associated with a memory 46 (Read Only Memory, ROM, and Random Access Memory, RAM), a keyboard 48 and the above screen 24-1 which, for example, is a liquid-crystal matrix display.

To use the measurement device according to the present invention, a user presses a specific key of keyboard 48. A program, stored in the ROM, is then executed by microprocessor 34. This program successively selects sensors 22, reads the corresponding values Vd provided by converter 44, and stores these values in the RAM. Then, or simultaneously, the read values are corrected by values prestored in a non-volatile memory, for example during a calibration step, and adequately displayed on screen 24-1. As indicated above, the measured values can be displayed in a system of coordinates as a function of the relative positions of the respective sensors, which directly indicates the measured rail profile. In addition, microprocessor 34 can execute many operations on the stored values, for example smoothing or any other useful operation.

As indicated above, the calibration values for each sensor are stored. Indeed, the distance d to be measured by each sensor is expressed by $d = A \cdot Vd + B$, where A and B are constant values. Accordingly, calibration consists in storing values A and B for each sensor. For this purpose, one operates as follows.

A first calibration step is achieved with the ruler directly laid on a conductive reference plane. This plane can be a steel plate having an accurate planearity. Preferably, the reference plane is a water plane whose planearity is perfect. The use of a water plane as a reference plane, according to the invention, is possible since the sensors are non-contacting, i.e., they do not impair the water surface which remains perfectly plane. Blocks 26 are then placed onto metal legs covered with water. Then, the user selects, by pressing a specific key, this first calibration step. The microprocessor executes a first measurement sequence by measuring voltages Vd for each sensor 22; voltages Vd correspond to distances d assumed to be zero.

Then, a second calibration step is carried out consisting in placing the ruler onto the reference plane by interposing reference blocks, having a known height, between the reference plane and blocks 26. The user selects the second calibration step consisting in carrying out a second measurement sequence, by storing voltages Vd which then correspond to distances d equal to the height of the reference blocks.

Thus, for each sensor, a system of two equations with two unknown values (coefficients A and B) is established. At the end of the second calibration step, the microprocessor calculates and stores coefficients A and B for each sensor.

Programs to execute the various above described operations can be written by any programmer.

Figure 4:
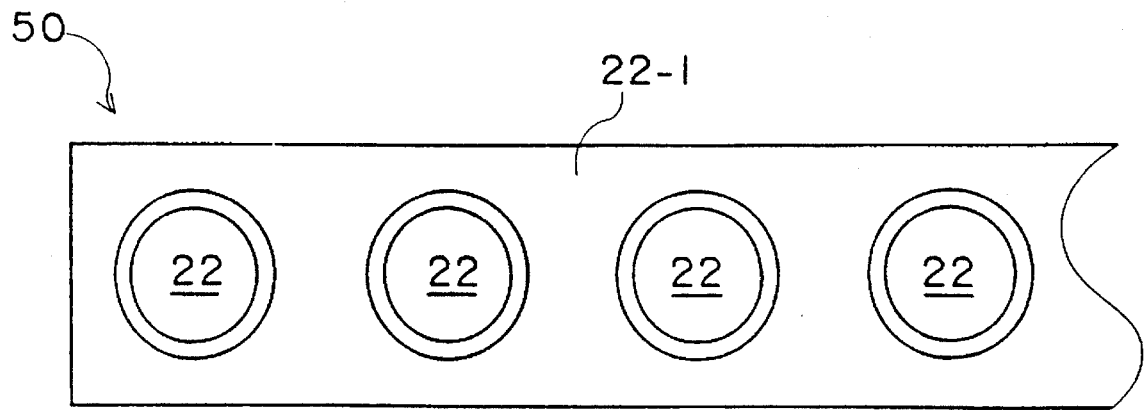
FIG. 4 represents capacitive distance sensors, formed on a printed circuit.

FIG. 4 represents an embodiment of a plurality of sensors 22. Sensors 22 are formed on a surface of a rectangular printed circuit 50. Sensors 22 are formed by etching, in the copper layer of one of the surfaces of the printed circuit, rings whose internal areas constitute sensors 22. The remaining copper surface constitutes the group of guard rings 22-1.

Figure 5:
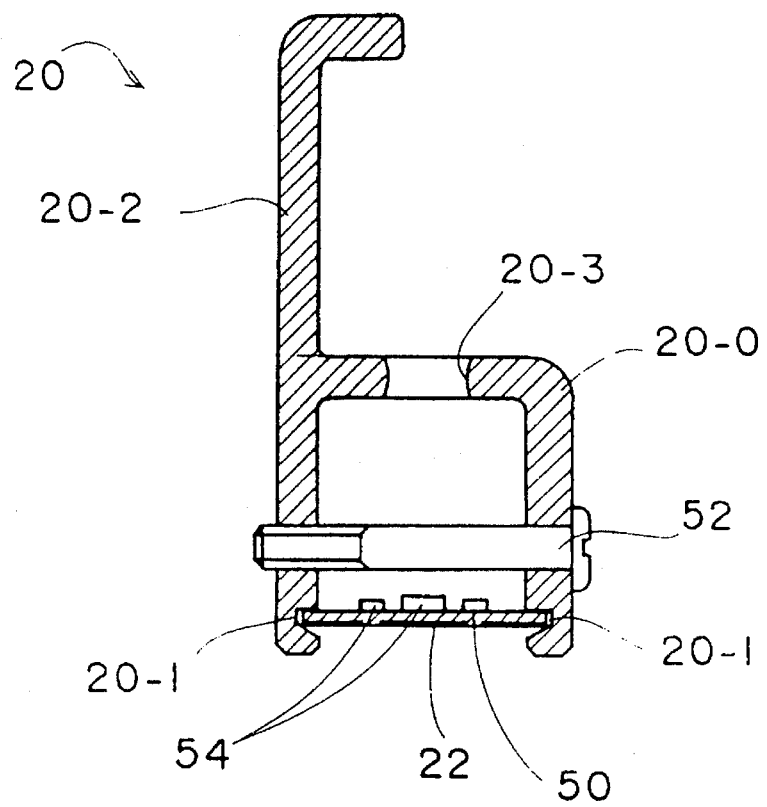
FIG. 5 represents a ruler for holding a plurality of printed circuits such as the one of FIG. 4.

FIG. 5 represents an embodiment of a measurement ruler according to the invention, that is, the part supporting sensors 22. This ruler is formed by a profile bar including a portion 20-0 having an inverted U section. One or more printed circuits 50 such as the one of FIG. 4 are inserted into internal grooves 20-1 of the edges of the U-portion, near the lower portion. As represented in FIG. 5, one edge of each groove 20-1 is horizontal and forms the reference surface and the abutment surface of the printed circuit 50. The other edge of grooves 20-1 is slanted so that the printed circuit 50 is urged against the two edges of the grooves without reaching the bottom of the grooves. Screws 52, distributed over the length of the ruler, pierce one of the edges of the U-portion and are screwed in the other edge. By screwing screws 52, the two edges of the U-portion are drawn closer and urge the printed circuit 50 against grooves 20-1, the slanted edges of the grooves urge the printed circuit 50 against the reference plane formed by the vertical edges of the grooves.

As represented, in order to further increase the flexural strength of ruler 20, the ruler includes a rising portion 20-2 so that the ruler is shaped like a "h". This rising portion can have a folded end, as represented in FIG. 5, to fix elements such as printed circuits.

The printed circuit 50 is provided, on its internal surface, with surface mounted components 54 such as, for example, the amplifiers 28 and capacitors C of FIG. 3. To measure the straightness of a rail, a 1-meter ruler should be used. Since it is difficult to form printed circuits having such a length, the printed circuit 50 is partitioned into five printed circuits, for example, having a length of 20 cm. Each printed circuit 50 is provided with a surface mounted connector to connect the outputs of amplifiers 28 and the common connection of capacitors C to a printed circuit (not shown) including the other elements of FIG. 3. The connectors of the printed circuits 50 can be accessed through apertures 20-3 formed in the U-portion 20-0.

In a practical embodiment, a distance of approximately 1 cm is provided between the sensors, especially in the central portion intended to be placed over a welding. In the outermost areas, a distance of 2 cm between the sensors is sufficient. However, to simplify the fabrication, the printed circuits 50 are identical and every two sensor is provided with its surface mounted components in the outermost portions of the ruler. Of course, a distance smaller than 1 cm can be chosen.

Figure 6:
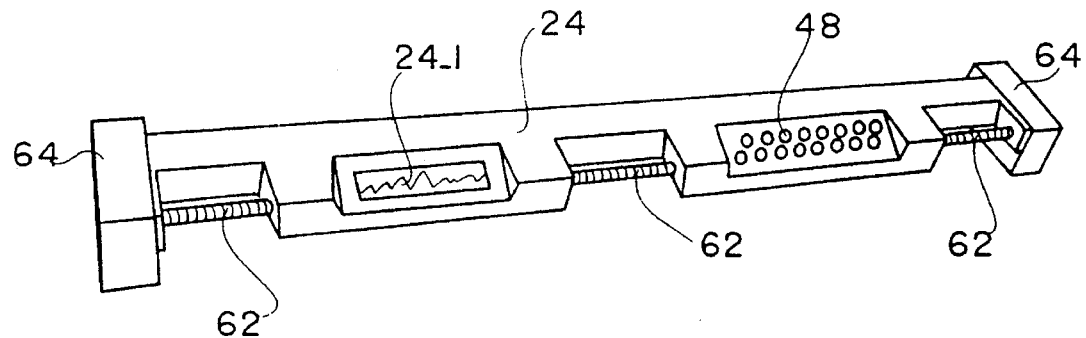
FIG. 6 represents an external perspective view of an embodiment of a measuring device according to the invention.

FIG. 6 is a perspective view of an embodiment of the straightness measurement device according to the invention. The casing 24 of this device generally has an elongated parallelipiped shape. Handles 62 are provided in three lateral recesses of the casing 24, one recess is disposed in the middle and the two other recesses are provided at the extremities. The above-mentioned screen 24-1 is disposed between an outermost recess and a central recess, and the keyboard 48 is disposed between the central recess and the other outermost recess.

Each extremity of the device is provided with a removable fixing block 64 including a system for rapid mounting on a rail or other profile part.

Figure 7:
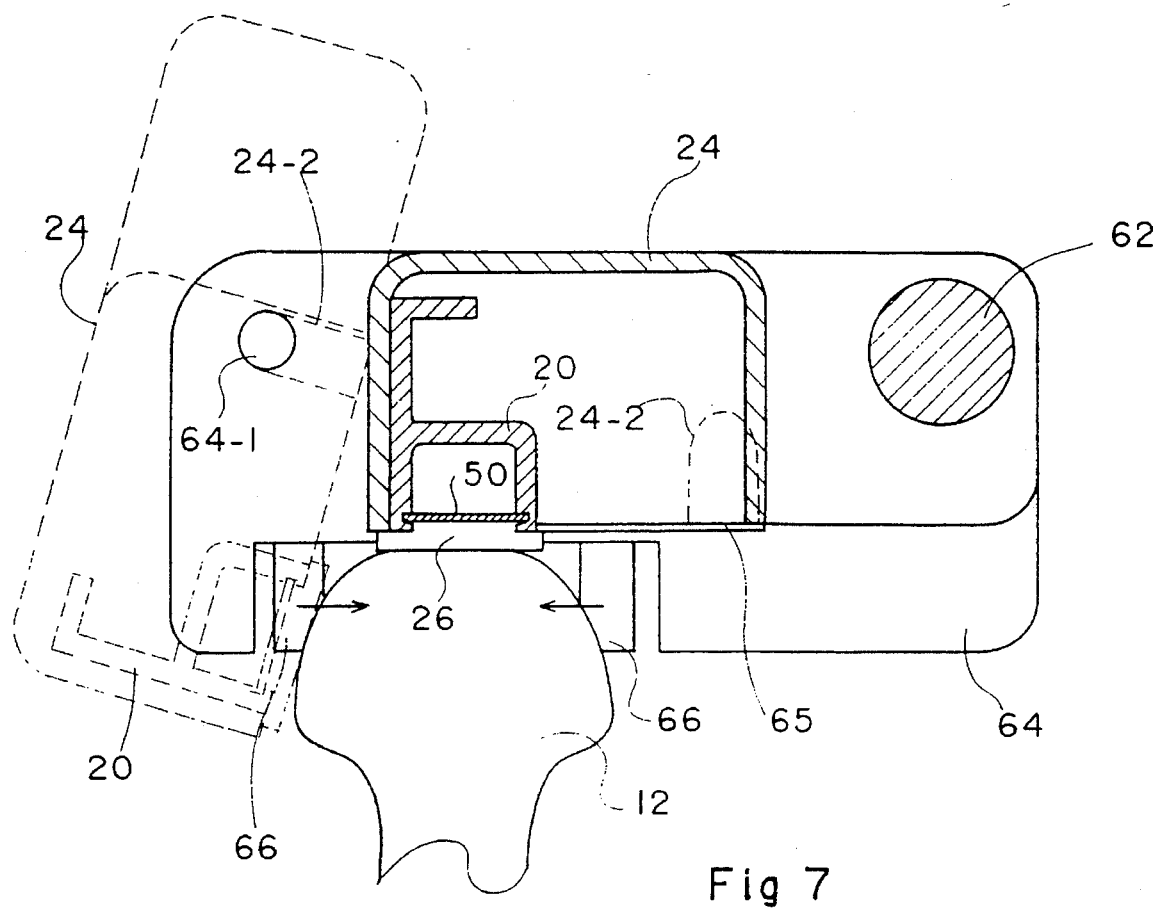
FIG. 7 is a cross sectional view of the device of FIG. 6 placed on a rail, a second position of an element of the device being drawn in dotted lines.

FIG. 7 is a cross-sectional view of the device along one of the handles 62. The same references as in FIGS. 1–6 designate the same elements. Casing 24 has an upside-down "U" shape which is closed at its lower portion by a plate 65. Ruler 20 is fixed by its longest portion to an edge of casing 60, on the opposite side of handles 62. Blocks 26 (only one of which is shown in FIG. 7) are fixed at the respective ends of ruler 20. Blocks 26 abut against a rail 12 and are electrically insulated from the remaining portion of the device since one of the block or both blocks, as above mentioned, transmit to the rail 12 an electric signal used to measure distances.

As represented, block 64 includes, beneath the ruler 20, a recess for the rail 12 provided with gripping jaws 66. Jaws 66 urge, through a hydraulic or mechanical control means (not shown), the rail 12 to fix the device on the rail while centering ruler 20 on the rail axis to carry out measurement at the adequate point.

As above mentioned, blocks 64 are removable. Casing 24 of the measuring device can be separated from the blocks 64 which remain fixed on the rail by acting on a mechanical control means. So, it is possible to reposition the casing 24, as represented in dotted lines, to measure the straightness of the edge of the rail 12. For this purpose, the end of casing 24 includes a groove 24-2 provided to slide on a tip 64-1 of block 64 and to hold the casing 24 at an adequate position.

The straightness measuring device according to the invention has been described for the measurement of the straightness of rails. Of course, the present invention applies to the measurement of the straightness of any conductive object, even made of low conductive material, such as water, graphite, and so on.

I claim:

1. A device for measuring the straightness of a conductive object, including a plurality of capacitive distance sensors aligned along an axis of a ruler to be placed on the object, and means for indicating the measurements provided by each sensor, wherein the capacitive sensors are formed on rectangular printed circuits at central portions of aligned rings which are etched on a copper layer of the printed circuits, the remaining copper outside the rings acting as guard means.

2. The straightness measuring device of claim 1, wherein the ruler includes at each end a block to be placed on the object, at least one of said blocks being conductive and providing the object with an electric signal which is needed for operation of the capacitive sensors.

3. The straightness measuring device of claim 1, wherein said printed circuits each comprise two surfaces, a first surface including thereon the sensors, a second surface having mounted thereon electronic circuits for processing the signals of the sensors.

4. The straightness measuring device of claim 1, including means for displaying in a coordinate system the amplitudes of the measurements provided by the sensors as a function of the respective positions of the sensors.

5. The straightness measuring device of claim 1, wherein said object is a rail.

6. The straightness measuring device of claim 1, wherein said conductive object to be measured is a rail and each end of the ruler is fixed, in a removable way, to a fixing means which includes gripping jaws for clamping the rail while aligning the axis of the sensors with the axis of the rail, means being further provided for repositioning the ruler laterally to measure the straightness of a rail edge at a predetermined position, once the fixing means are fixed on the rail.

7. The straightness measuring device of claim 1, wherein the printed circuits are held in two opposite grooves inside a "U"-shaped portion of the ruler, one of the edges of each groove being straight and serving as an abutment for the printed circuits, the other edge of each groove being slanted to contact the printed circuit so that the printed circuit does not reach the bottom of the groove, clamping means being further provided to draw closer the two edges of the "U"-portion.

* * * * *